United States Patent [19]
Holzheimer

[11] Patent Number: 5,382,007
[45] Date of Patent: Jan. 17, 1995

[54] CONSTANT FORCE TORSION SPRING APPARATUS

[75] Inventor: John C. Holzheimer, Wilmington, N.C.

[73] Assignee: The B. F. Goodrich Company, Akron, Ohio

[21] Appl. No.: 938,090

[22] Filed: Aug. 31, 1992

[51] Int. Cl.$^6$ ............................................. F16F 1/14
[52] U.S. Cl. ........................................ 267/154; 74/96; 267/280
[58] Field of Search ............... 267/154, 274, 280, 281, 267/282, 273, 275, 276, 279; 74/92; 280/717

[56] References Cited
U.S. PATENT DOCUMENTS

| | | | |
|---|---|---|---|
| 1,892,064 | 12/1932 | Markey | 267/280 |
| 2,477,187 | 7/1949 | Lanchner | 267/280 |
| 2,563,090 | 8/1951 | Woolson et al. | 267/280 |
| 2,782,453 | 2/1957 | Schlage | 74/96 |
| 3,113,769 | 12/1963 | Pryale | 280/717 |
| 3,336,021 | 6/1965 | Kramer | 267/154 |
| 4,651,583 | 3/1987 | Suzuki | 74/96 |
| 4,714,220 | 9/1986 | Hillstrom et al. | 248/160 |

*Primary Examiner*—Matthew C. Graham
*Attorney, Agent, or Firm*—Richard A. Romanchik

[57] ABSTRACT

A constant force mechanism includes a base (410), a load arm (414) pivotally connected to the base at one end, a spring arm (412) pivotally connected to the base at one end with a torsion spring (416), and a pinch roller (420) for rotationally and translationally connecting the load arm to the spring arm, wherein a load is applied to the load arm end (424) opposite the end connected to the base.

22 Claims, 7 Drawing Sheets

CONSTANT FORCE TORSION SPRING APPARATUS

TECHNICAL FIELD

This invention relates to torsion springs, and more particularly, to a mechanism which utilizes a torsion spring to provide a constant linear force.

BACKGROUND OF THE INVENTION

Torsion springs are well known devices utilized for, among other things, providing resistive force against both torsional and linear motion. Some of the advantages of torsion springs over other type springs are lower cost, smaller packaging and better reliability. Typical prior torsion springs have been made by concentrically positioning cylindrical sleeves of metal of different diameters and securing a resilient material, such as an elastomer, therebetween. The inner sleeve is secured to a first element which is to be resiliently carried for torsional movement and the outer cylindrical sleeve is secured to another or second element such as a housing and with respect to which the first element has relative torsional movement. This type of torsion spring is known as an elastomeric torsion spring.

Figure 1:
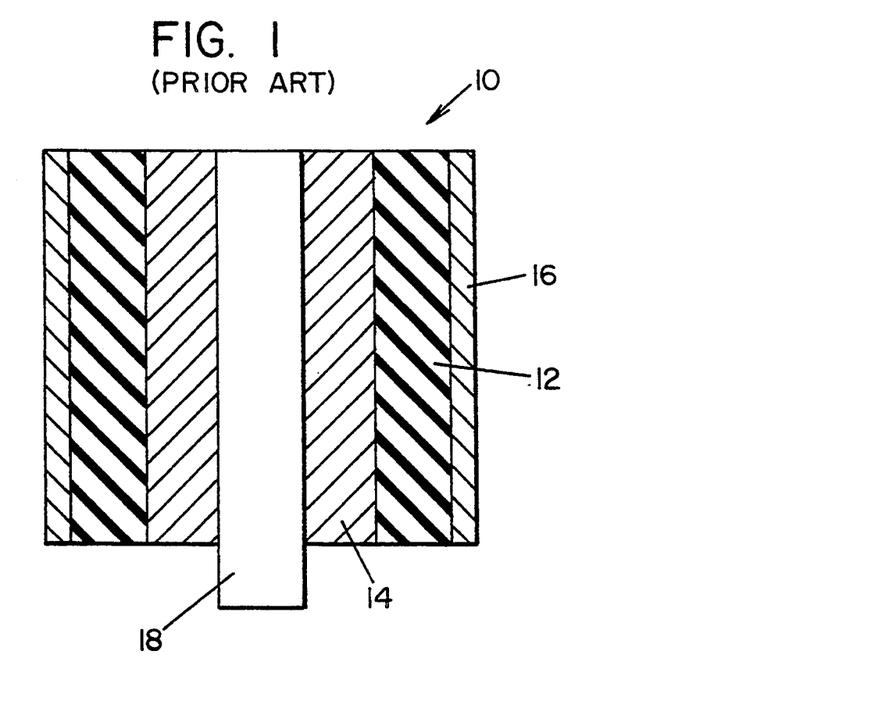
FIG. 1 is a cross sectional, side view of a prior art elastomeric torsion spring.

FIG. 1 illustrates a prior elastomeric torsion spring 10 which includes an elastomeric member 12 disposed between and bonded to an inner sleeve 14 and an outer shell 16. Typically, outer shell 16 is anchored and inner sleeve 14 is keyed so that a shaft 18 extending therethrough can be utilized to rotate the inner sleeve 14 with respect to the outer shell 16. Under these circumstances, shaft 18 and outer shell 16 must be connected to parts of a device which are intended to move relative to one another.

Figure 2:
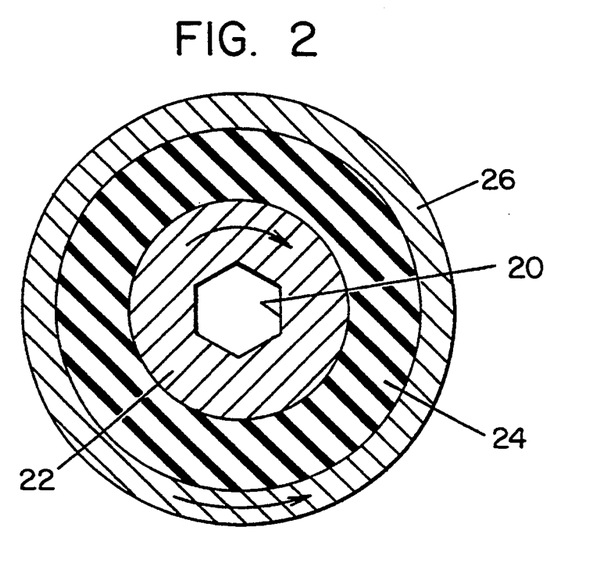
FIG. 2 is a cross sectional, top view of a typical elastomeric torsion spring.

FIG. 2 illustrates an elastomeric torsion spring having an outer shell 26 which rotates in a direction opposite to the direction of rotation of an inner sleeve 22. A center shaft 20 of the inner sleeve 22 is keyed, thereby allowing the shaft 20 to be rotated by a keyed rod (not shown). The outer shell 26 therefore must be connected or anchored to something which has torsional movement with respect to the inner shaft. Each spring arranged and utilized in such a manner has a particular windup or spring rate curve to describe the amount of torque provided by the spring for any given angular displacement or torsional movement between the inner sleeve and the outer shell.

Figure 3:
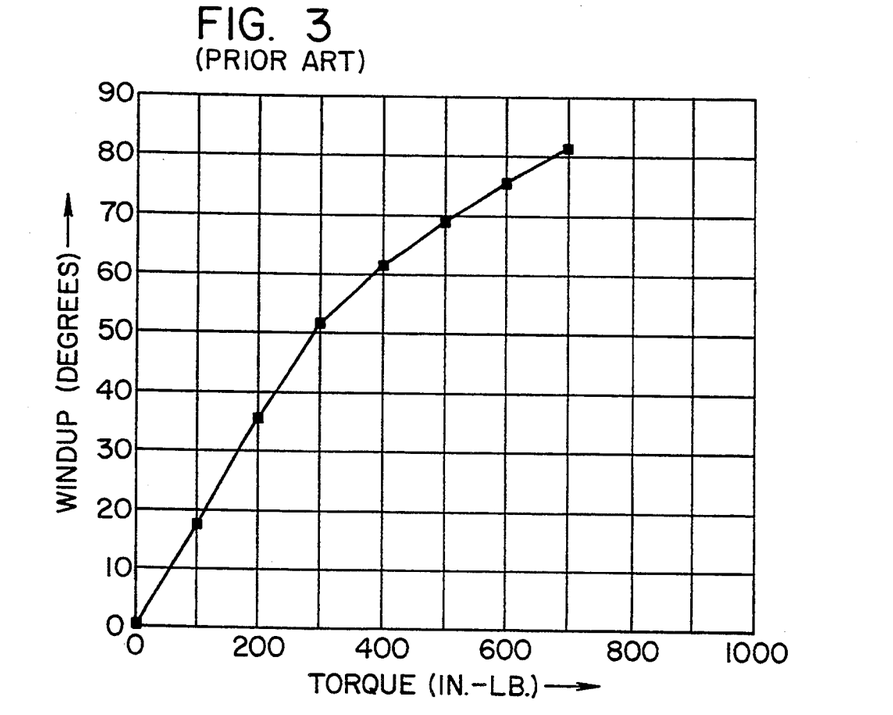
FIG. 3 is an illustration of a spring rate curve for a prior art elastomeric torsion spring.

FIG. 3 illustrates a torque versus windup curve of a typical prior torsion spring such as is shown in FIG. 1. Designers who incorporate torsion springs such as illustrated in FIG. 1 utilize the torque versus windup characteristics to anticipate the amount of torque produced by the spring at any particular given amount of angular displacement. It can be seen from FIG. 3 that the torque provided by the spring generally increases as the windup of the spring increases. It can also be seen that the torque is not directly (linearly) proportional to the windup, with the nonlinearity becoming more pronounced at higher angular deflections.

There are certain applications in which it is advantageous to utilize a torsion spring to provide torque which is constant over a particular distance or angular displacement. A device which accomplishes this is therefore desirable. In addition, since torsional springs heretofore provide a singular torque vs. windup curve, it has previously been necessary to change them out in order to achieve varying amounts of torque for a given displacement. It is not always practical however to change springs in a structure in order to accomplish this objective. Likewise, a constant force mechanism utilizing prior torsion springs requires changing of the spring in order to provide different force levels. A constant force mechanism which utilizes a torsion spring having a multiplicity of linear torque vs. windup curves can provide differing force levels without changing springs, and is therefore also highly desirable.

DISCLOSURE OF THE INVENTION

An object of the present invention is to provide an apparatus that utilizes a torsion spring to provide constant force.

Another object of the present invention is to provide an apparatus that utilizes a torsion spring to provide constant force, and has a plurality of programmable force constants.

In accordance with the present invention, a constant force mechanism includes a base, a load arm pivotally connected to the base at one end, a spring arm pivotally connected to the base at one end with a torsion spring, and a pinch roller for rotationally and translationally connecting the load arm to the spring arm, wherein a load is placed on the end of the load arm opposite the end connected to the base.

The present invention effectively integrates superior size and reliability characteristics of torsion springs into a constant force mechanism. In addition, the present invention provides a multiplicity of forces utilizing a singular torsion spring, thereby eliminating the need to change hardware to obtain the different spring rates.

These and other objects, features, and advantages of the present invention will become more apparent in light of the detailed description of exemplary embodiments thereof, as illustrated by the drawings.

PREFERRED EMBODIMENT FOR CARRYING OUT THE INVENTION

Figure 4A:
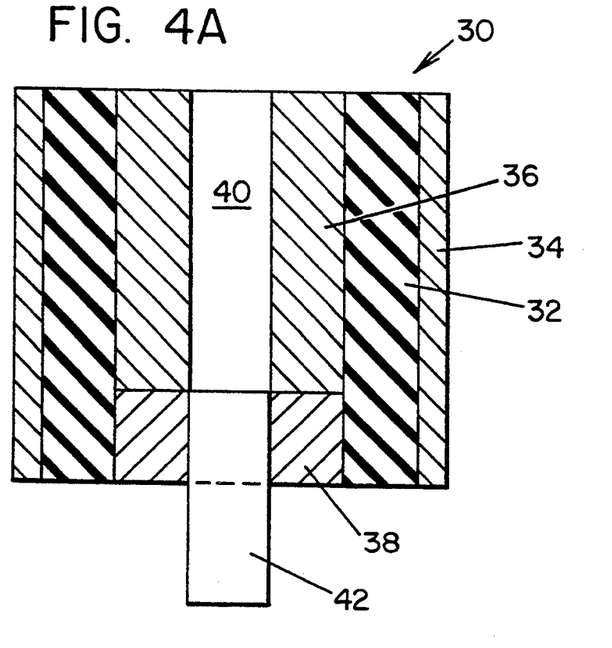
FIGS. 4A, 4B are cross sectional, side views of a first embodiment of an elastomeric torsion spring in accordance the present invention.

Referring now to FIG. 4A, a first embodiment of an elastomeric torsion spring 30 in accordance with the present invention includes an elastomeric member 32, which is preferably of a hollow, generally cylindrical configuration, with its outer peripheral surface fixedly secured or bonded to an outer sleeve or shell 34 comprised of a rigid material, such as metal. The elastomeric member 32 also has an inner peripheral surface fixedly secured or bonded to a pair of inner sleeves 36, 38, comprised of a similar material as outer shell 34. Elastomeric member 32 is comprised of an elastomer, such as vulcanized rubber or other elastomeric polymer composition having suitable durometer hardnesses, spring rates, and other properties, all of which are now determinable by one skilled in the art in a given application. An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like.

Elastomeric member 32 is bonded to outer shell 34 and inner sleeves 36, 38 by any of a number of suitable methods well known in the art, such as by first applying a primer, such as CHEMLOK® 250, and then a cement, such as CHEMLOK® 252 to the bonding surfaces of shell 34 and sleeves 36, 38 and then injecting elastomer into the void therebetween under heat and pressure to thereby vulcanize and bond the elastomer at the same time. CHEMLOK® 250 and CHEMLOK® 252 are registered trademarks of the Lord Corporation located in Erie, Pa.

Inner sleeves 36 and 38 are disposed adjacent to one another in axial alignment (axially) but are not connected so that each may be rotated (with respect to the outer shell 34) independently of one another. This type of configuration may be described as a "split shaft" or "multiple shaft" because the inner sleeve can be likened to a singular sleeve having one or more splits. In the first embodiment of the present invention, inner sleeves 36 and 38 have the same thickness. Although inner sleeves 36 and 38 are generally cylindrical, they may configured so as to provide a shaft which is keyed in a manner similar to the spring illustrated hereinbefore in FIG. 2. A rod 42 which has a cross section to match the cross section of shaft 40 may consequently be inserted in shaft 40 so as to provide a means to rotatably turn sleeves 36 and 38 with the respect to outer shell 34, thereby providing torsional movement. FIG. 4A illustrates a rod 42 which is inserted so as to engage only the lower inner sleeve 38.

Figure 4B:
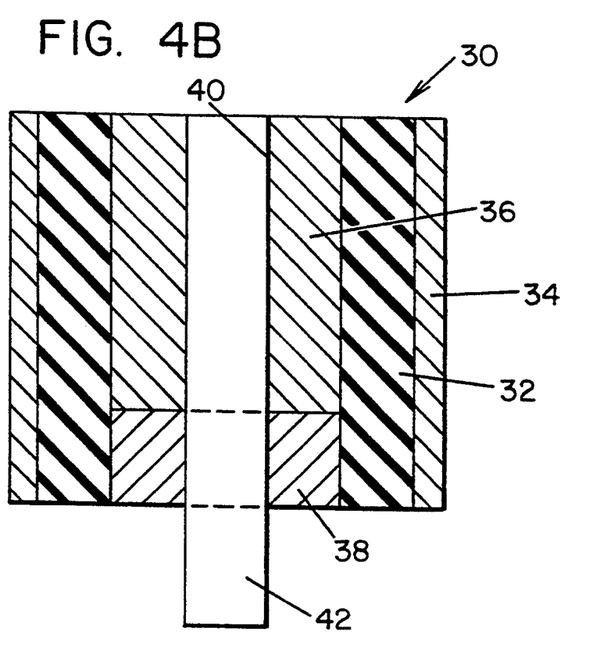

Referring now to FIG. 4B, wherein it is illustrated that rod 42 is inserted in elastomeric torsion spring 30 so as to engage both upper inner sleeve 36 and lower sleeve 38. In this manner, FIGS. 4A and 4B illustrate how a singular elastomeric torsion spring 30 may be utilized to have two different spring rates, depending on the location and engagement of a rod 42 which extends therethrough.

Figure 5:
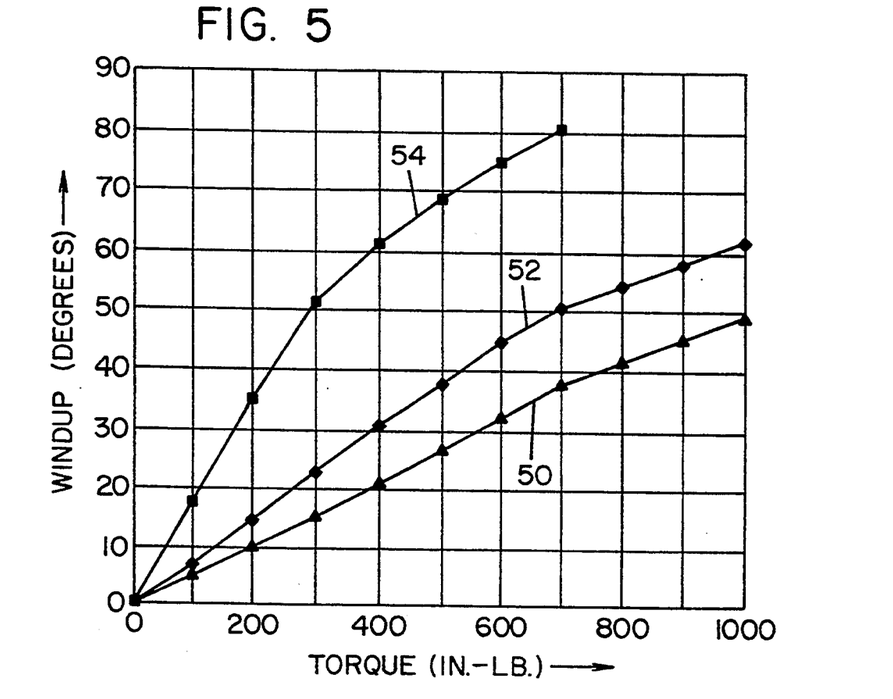
FIG. 5 is an illustration of spring rate curves characteristic of an elastomeric torsion spring in accordance with the present invention.

Referring now to FIG. 5, wherein three separate and distinct spring rate curves 50, 52 and 54 are illustrated which are characteristic of an elastomeric torsion spring 30 similar to that shown hereinbefore in FIGS. 4A and 4B. The lowest curve, 54 or the curve showing the lowest spring rate is indicative of elastomeric torsion spring 30 having rod 42 engaged only with the lower inner sleeve 38 (illustrated in FIG. 4B). Curve 52 illustrates a slightly higher spring rate curve, indicative of elastomeric torsion spring 30 having rod 42 positioned so as to be engaged only with the upper sleeve 36. Curve 50 illustrates the highest spring rate, and is indicative of elastomeric torsion spring 30 when rod 42 is positioned so as to be engaged with both upper 36 and lower 38 inner sleeves (illustrated in FIG. 4B). It can be seen that three separate and distinct spring rate curves can be obtained from the singular elastomeric torsion spring 30 by selectively engaging rod 42 with inner sleeves 36, 38 in different manners by positioning the rod 42 accordingly. Heretofore, it was necessary to provide three separate and distinct springs in order to obtain the curves illustrated in FIG. 5.

It is to be noted that although two inner sleeves 36, 38 are illustrated in FIGS. 4A, 4B other configurations, including three or more inner sleeves may be utilized to thereby increase the number of respective spring rate curves for any one particular elastomeric torsion spring.

Figure 6:
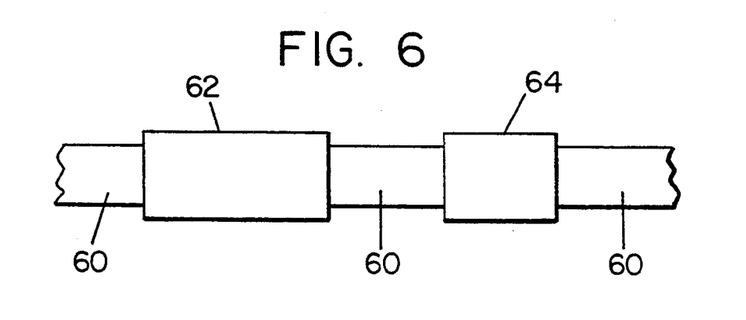
FIG. 6 is a side view of an inner shaft to be utilized with the elastomeric torsion springs in accordance with the present invention.

Referring now to FIG. 6, a rod 60 for engagement with inner sleeves 36, 38 of FIGS. 4A and 4B is illustrated wherein the rod has elevated outer diameter sections 62, 64 at particular locations along the length of the rod. The rod 60 may in this manner selectively engage different inner sleeves of an elastomeric torsion spring by selectively positioning the rod 60 in a spring so as to engage different inner sleeves at different points. An elastomeric torsion spring may in this manner have a multiplicity of different spring rates simply by controlling the axial position of the rod 60 in the spring.

Figure 7A:
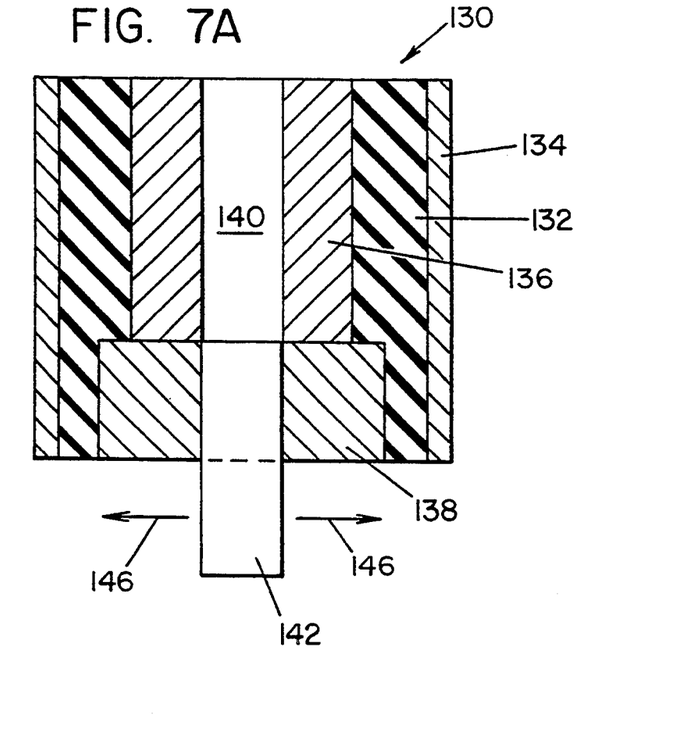
FIGS. 7A, 7B are cross sectional, side views of a second embodiment of an elastomeric torsion spring in accordance with the present invention.

Referring now to FIG. 7A, wherein an elastomeric torsion spring in accordance with a second embodiment of the present invention is generally similar to the elastomeric torsion spring illustrated hereinbefore in FIGS. 4A and 4B, and is thus indicated by reference numerals corresponding to those discussed above, except that a 100 "prefix" is utilized. A second embodiment of an elastomeric torsion spring 130, therefore includes an elastomeric member 132 which is disposed between and bonded to an outer shell 134 and a pair of inner sleeves 136, 138. Inner sleeves 136, 138 are disposed so as to have a common inner shaft 140 through which a rod 142 extends. In the second embodiment elastomeric torsion spring 130, however, inner sleeves 136 and 138 have different outer diameters, wherein lower inner sleeve 138 has a larger outer diameter than upper inner sleeve 136.

Prior elastomeric torsion springs such as that illustrated in FIG. 1 required a relatively thick elastomeric layer in order to meet spring rate curve requirements. These springs are not, however, able to handle large radial loads, thereby necessitating the use of other mechanisms, such as bearings, in conjunction with the elastomeric torsion spring. In the present invention, the thickness of elastomer 132 is reduced adjacent to lower inner sleeve 138. Consequently, elastomer 132 can address higher radial loads at the lower portion of spring 130 than the elastomer at the upper portion of spring 130. A radial load is a load imposed on rod 142 in the direction of exemplary arrows 146.

Figure 7B:
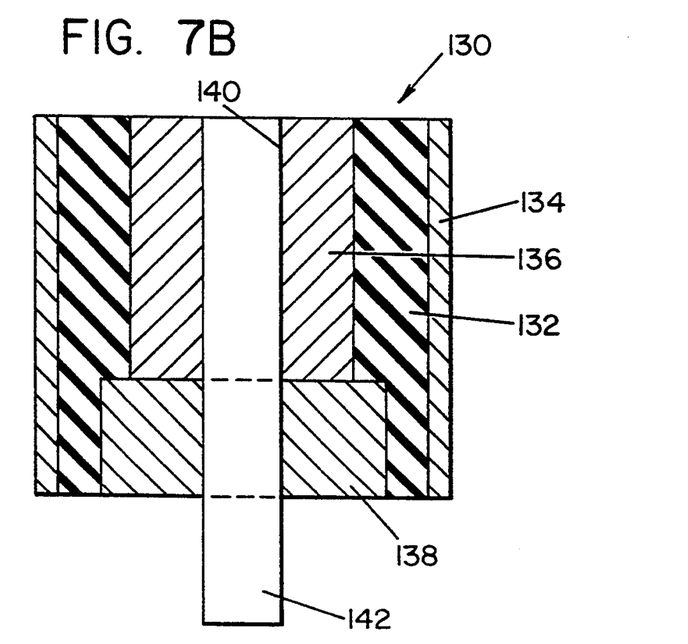

Referring now to FIG. 7B, wherein it is illustrated that rod 142 is extended the full length of the elastomeric torsion spring 130 to thereby engage both upper inner sleeve 136 and lower inner sleeve 138 to thereby provide a spring having a relatively high spring rate and yet being able to accommodate large radial loads appearing at the lower end of shaft 142. In this manner, elastomeric torsion spring 130 is adaptable to many different spring rate and load requirements, for it provides a high spring rate combined with high radial load tolerance, thereby eliminating a need for a bearing device such as was used for prior art elastomeric torsion springs.

Figure 8:
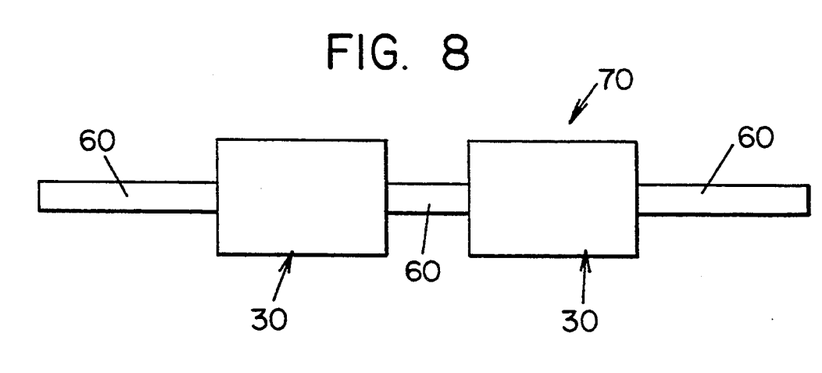
FIG. 8 is a side view of an apparatus utilizing two elastomeric torsion springs in accordance with the present invention connected in series.

Referring now to FIG. 8, an elastomeric torsion spring apparatus 70 in accordance with the present invention includes a pair of elastomeric torsion springs 30 such as those illustrated in FIGS. 4A and 4B, which are connected in series to a free floating shaft 60 such as that illustrated in FIG. 6. That is, if one spring is attached to one member of a linkage and if the other spring is attached to the other member of a linkage, the shaft 60 floats to an intermediate position. Because springs 30 are identical, this series arrangement allows each spring to windup a given amount while seeing the same torque, thereby effectively doubling the angle of rotation and cutting the net spring rate in half. Shaft 60 may be configured so as to selectively engage different sections of the inner sleeves of the springs 30. In this manner, a greater number of spring rates may be obtained from a singular apparatus 70. For instance, in the present example, apparatus 70 is capable of having 27 different spring rates. It is therefore readily apparent to one skilled in the art that the present invention provides a tremendous amount of flexibility in designing elastomeric torsion springs for many different applications which require a multiplicity of spring rates.

Figure 9A:
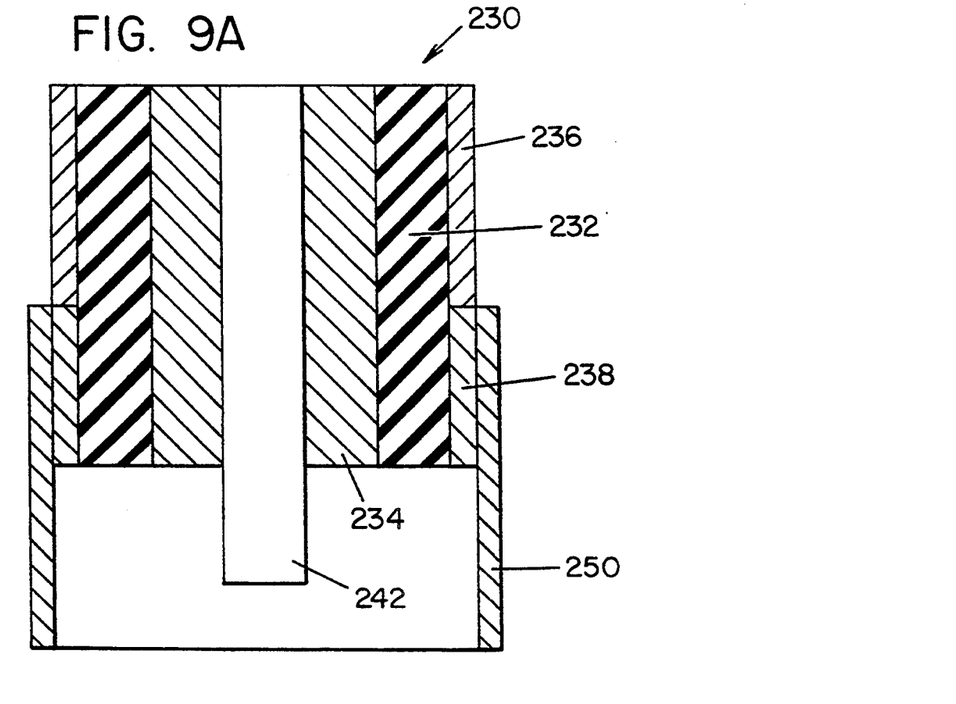
FIGS. 9A, 9B are cross sectional, side views of a third embodiment of an elastomeric torsion spring in accordance with the present invention.

Referring now to FIG. 9A, wherein an elastomeric torsion spring in accordance with a third embodiment of the present invention is generally similar to the elastomeric torsion spring illustrated hereinbefore in FIGS. 4A and 4B, and is thus indicated by reference numerals corresponding to those discussed above, except that a 200 "prefix" is utilized. A third embodiment of an elastomeric torsion spring 230, therefore includes an elastomeric member 232 which is disposed between and bonded to an inner sleeve 234 and a pair of outer shells 236, 238. Outer shells 236, 238 are disposed adjacent to one another and are axially aligned. Inner sleeve 234 defines an inner shaft through which a rod 242 extends. The pair of outer shells 236, 238 function in a similar manner as the pair of inner sleeves defined in earlier described embodiments. An engagement means 250 selectively engages the outer shells 236, 238. Selectively engaging the outer shells 236, 238 in different combinations provides different spring rates in a manner similar to selectively engaging multiple inner sleeves described hereinbefore. FIG. 9A illustrates the selective engagement of engagement means with lower outer shell 238.

Figure 9B:
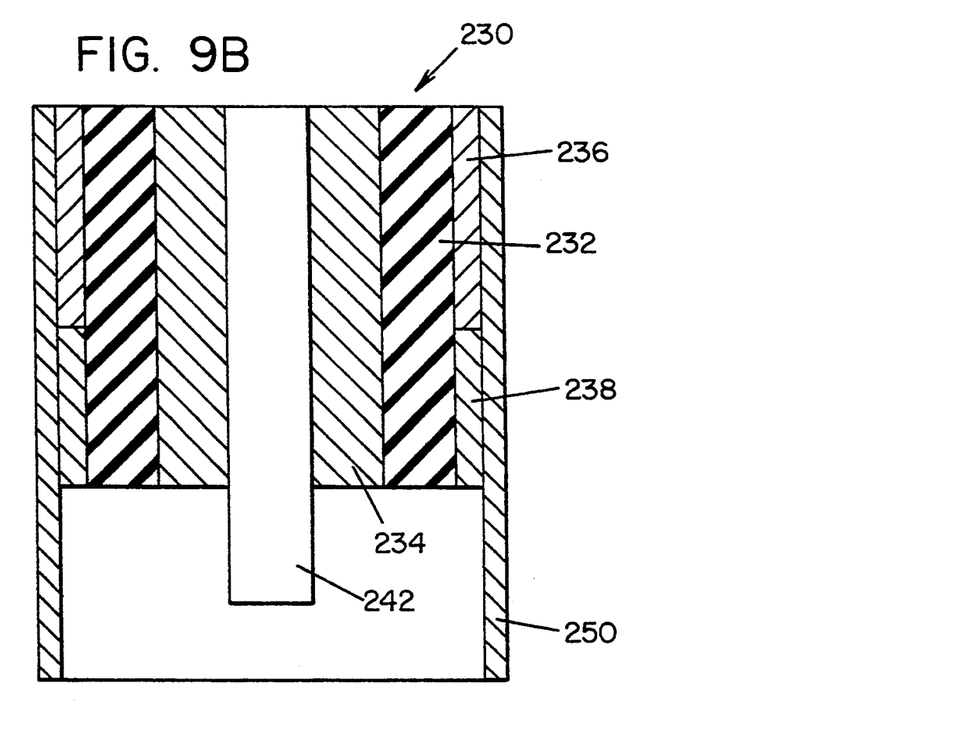

Referring now to FIG. 9B, which illustrates the selective engagement of engagement means 150 with both lower outer shell 238 and upper outer shell 236. Three different spring rate curves, similar to the spring rate curves illustrated in FIG. 5 may therefore be obtained by utilizing one inner sleeve and two outer shells. It is to be noted that more than three different spring rate curves may be obtained from a singular spring if more than two outer shells are provided, with the number of outer shells not being limited to the examples illustrated herein.

Figure 10:
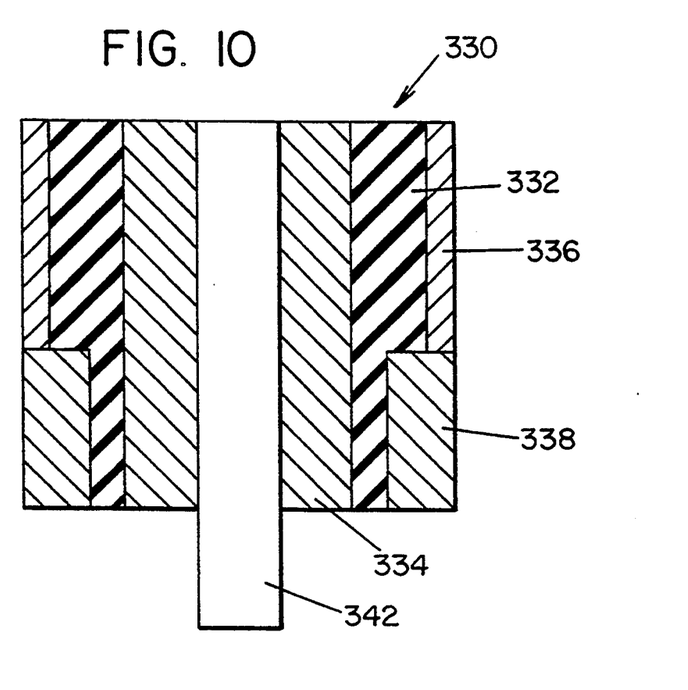
FIG. 10 is a cross sectional, side view of a fourth embodiment of an elastomeric torsion spring in accordance with the present invention.

Referring now to FIG. 10, wherein an elastomeric torsion spring in accordance with a fourth embodiment of the present invention is generally similar to the elastomeric torsion spring illustrated hereinbefore in FIGS. 9A and 9B, and is thus indicated by reference numerals corresponding to those discussed above, except that a 300 "prefix" is utilized. A fourth embodiment of an elastomeric torsion spring 330, therefore includes an elastomeric member 332 which is disposed between and bonded to an inner sleeve 334 and a pair of outer shells 336, 338. Outer shells 336, 338 are disposed adjacent to one another and axially aligned. Inner sleeve 334 defines an inner shaft through which a rod 342 extends. The pair of outer shells 336, 338 function in a similar manner as the pair of inner sleeves defined in earlier described embodiments. Lower outer shell 338, however, is thicker than upper outer shell 336. The elastomer adjacent to the lower shell 338 is therefore thinner than the elastomer adjacent to upper shell 336. This differential in elastomer thickness functions similarly to the spring embodiment described and illustrated hereinbefore for FIGS. 7A and 7B, and therefore provides superior radial load characteristics as earlier described.

It is to be noted that elastomeric members 32, 132, 232, 332 and outer shells 34, 134, 236, 238, 336, 338 illustrated and described in the previous figures need not be cylindrical, but may have other shapes, such as rectangular. In addition, the outer shells so described are provided for containing the elastomeric member, and do not necessarily have to be bonded to the elastomeric member. For example, the elastomeric member may be press fitted into the outer shell without a bonding agent, with the outer shell serving as a containment member. Alternatively, the elastomeric member may be formed having a predetermined shape, and may then be simply inserted into the outer shell, wherein the outer shell contains the elastomeric member when the elastomer is placed under stress.

It is also to be noted that elastomeric torsion spring of the present invention need not be limited to the cross sectional top view as illustrated in FIG. 2, but may have any of a number of configurations well known to those skilled in the art. Examples of such springs are disclosed in commonly owned U.S. Pat. Nos. 3,336,0214 (Kramer) and 4,714,220 (Hillstrom et al.) which are hereby incorporated herein by reference.

Figure 11:
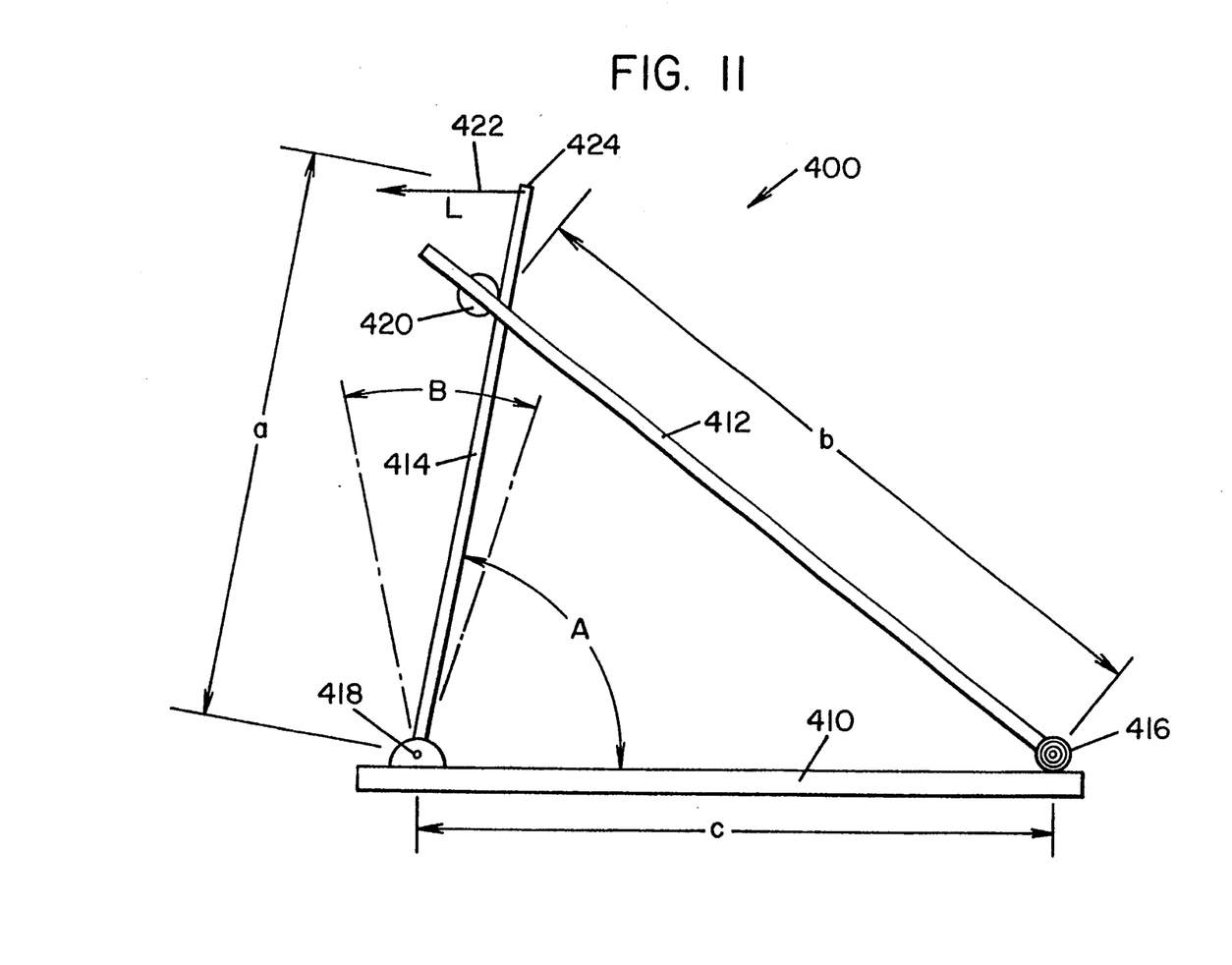
FIG. 11 is a side view of a constant force mechanism in accordance with the present invention.

Referring now to FIG. 11, a constant force mechanism 400 for providing a constant torsional force includes a base 410, an spring arm 412 and a load arm 414. The spring arm 412 is pivotally connected to the base 410 utilizing a torsion spring means 416, such as those described and illustrated hereinbefore in FIGS. 4A, 7A and 9A. A suitable manner of connection would be to have the outer shell of spring 416 connected to base 410 and the inner sleeve of spring 416 or a rod extending through the inner sleeve connected to spring arm 412. Load arm 414 is pivotally connected to base 410 by a pivot means 418 which facilitates rotational movement of load arm to 414 with respect to base 410. Load arm 414 and upright 412 are pivotally and translationally attached to one another utilizing a roller means 420, such as a link and roller mechanism, which allows the spring arm 412 to translate along the length of load arm 414 while still being connected. A constant torque as signified by arrow 422 is provided at the distal end 424 of load arm 414 and is characterized by the following equation.

$$T_B = \frac{(\operatorname{Sin} A)\left(\operatorname{Cos}\frac{B}{2}\right)\left[\operatorname{Cos}\left(\operatorname{Sin}^{-1}\left(\frac{c}{b}\operatorname{Sin} A\right)\right)\right]La}{\operatorname{Sin}\left[180 - A - \operatorname{Sin}^{-1}\left(\frac{c}{b}\operatorname{Sin} A\right)\right]}$$

Where:

$T_B$ is torque applied by (or torsional rate of) spring 416 illustrated in FIG. 11 and described in inch pounds.

A is angle A shown in FIG. 10 and described in degrees.

B is angle B of rotational movement of load arm 414 shown in FIG. 10 and described in degrees.

a is distance a shown in FIG. 10 and described in inches.

b is distance b shown in FIG. 10 and described in inches c is distance c shown in FIG. 10 and described in inches.

L is the output load illustrated as arrow 422 in FIG. 10 and described in pounds.

Constant force apparatus 400 compensates for the non-linear force characteristics of torsion springs as illustrated in FIGS. 3 and 5 hereinbefore. Utilization of the constant force apparatus 400 allows flexibility for designers to utilize torsion springs to provide a constant force output. The wide variety of spring rates available with the split sleeve and split shell elastomeric torsion springs described hereinbefore provide further advantage in that a constant force mechanism with a multiplicity of force outputs can thus be provided.

It is to be noted that torsion spring means 416 may be any of a number of torsion springs, and is not limited to the elastomeric torsion springs described hereinbefore. For instance, spring 416 may be a metal torsion spring, or the elastomeric torsion spring 10 described hereinbefore in FIG. 1, or the springs disclosed in the Kramer and Hillstrom et al. patents. Spring 416 may also be a series type elastomeric torsion spring apparatus such as is described hereinbefore in FIG. 8, which incorporates either one or more split shaft type elastomeric torsion springs, or one or more prior art elastomeric torsion springs, or a combination thereof.

Although the invention has been shown and described with exemplary embodiments thereof, it should be understood by those skilled in the art that the foregoing and various other changes, omissions, and additions may be made therein and thereto without departing from the spirit and the scope of the invention.

I claim:

1. An apparatus for acting upon a load comprising: base means;
   load arm means with a length d1 and having: a) a first end pivotally connected to said base means; and b) a second end for applying the load thereto;
   spring arm means with a length d2 and having: a) a third end pivotally connected by torsion spring means to said base means a predetermined distance from said first end; and b) a fourth end slidably connected to said load arm means,
   whereby the load applied at said second end: a) causes said first and third ends to pivot relative to said base; b) causes said fourth end to translate along said load arm means; and c) is acted upon by a constant force provided by said apparatus.

2. An apparatus according to claim 1, wherein said torsion spring means is comprised of:
   a shaft member having an annulus of elastomeric material bonded thereon as a yieldable member;
   a housing member surrounding the outer periphery of said annulus for containing said annulus,
   wherein one of said members is connected to said base means and the other one of said members is connected to said spring arm means.

3. An apparatus according to claim 2, wherein said housing member has a split therein to define a gap, and said housing member has a pair of spaced legs at said gap to facilitate the compression of said elastomeric material upon connection of said spaced legs.

4. An apparatus according to claim 1, wherein said torsion spring means comprises:
   an elastomeric member having an outer surface and an inner shaft;
   an outer shell means for surrounding and containing said outer surface; and,
   a plurality of axially aligned inner sleeves bonded to said inner surface.

5. An apparatus according to claim 4, wherein said plurality of inner sleeves are disposed adjacent to one another.

6. An apparatus according to claim 4, wherein said plurality of inner sleeves are keyed for transmittal of torsional forces.

7. An apparatus according to claim 4, further comprising:
   rod means for selectively engaging with at least one of said plurality of inner sleeves to effectuate torsional movement between the engaged said plurality of inner sleeves and said outer shell means.

8. A spring according to claim 7, wherein said rod means is adjustable and can thereby selectively engage a multiplicity of said plurality of inner sleeves.

9. A spring according to claim 7, wherein said inner sleeves define a central shaft and said rod means is comprised of a rod having selective engagement portions for selectively engaging with said inner sleeves as a function of the axial position of said rod in said central shaft.

10. An apparatus according to claim 4, wherein at least two of said plurality of inner sleeves have different thicknesses and said elastomeric member varies in thickness to accommodate said plurality of inner sleeves.

11. An apparatus according to claim 4, wherein said outer shell means is a longitudinally split shell in which the internal edges of the shell at the split are smoothly rounded and wherein elastomer fills in the split.

12. A spring according to claim 11, wherein said outer shell means is provided with shoulders which may be keyed for transmittal of torsional forces.

13. A spring according to claim 11, wherein the longitudinal edges of said outer shell means at the split are turned radially outward.

14. An apparatus according to claim 4, wherein said outer shell means has a split therein to define a gap, said outer shell means having a pair of spaced legs at said gap to facilitate compression of said elastomeric member upon connection of said leg members.

15. An apparatus according to claim 1, wherein said torsion spring means comprises:
   an elastomeric member having an outer surface and an inner shaft;
   an inner sleeve bonded to said inner shaft; and,
   a plurality of axially aligned outer shell means for surrounding and containing said outer surface.

16. A spring according to claim 15, wherein said plurality of outer shell means are disposed adjacent to one another.

17. A spring according to claim 15, wherein said plurality of outer shell means are keyed for transmittal of torsional forces.

18. A spring according to claim 15, wherein at least two of said plurality of outer shell means have different thicknesses and said elastomeric member varies in thickness to accommodate said plurality of outer shell means.

19. A spring according to claim 15, further comprising:
   engagement means for selectively engaging with at least one of said plurality of outer shell means to effectuate torsional movement between the engaged said plurality of outer shells and said inner sleeve.

20. A spring according to claim 19, wherein said engagement means is adjustable and can thereby selectively engage a multiplicity of combinations of said plurality of outer shell means.

21. An apparatus according to claim 1, wherein said torsion spring means comprising:
   a rod having a plurality of engagement means; and,
   a plurality of torsion springs disposed axially on said rod in a series arrangement, wherein each one of said plurality of torsion springs is comprised of: a) an elastomeric member having an outer surface and an inner shaft; b) an outer shell means for surrounding and containing said outer surface; and, c) a plurality of axially aligned inner sleeves bonded to said inner surface and disposed on said rod.

22. An apparatus according to claim 21, wherein said engagement means engage with selective ones of said plurality of inner sleeves as a function of the axial position of said rod.

* * * * *